United States Patent Office 3,373,196
Patented Mar. 12, 1968

3,373,196
7- AND/OR 9-(LOWER ALKYL) AMINO-5a,6-ANHYDROTETRACYCLINES
Panayota Bitha, New York, and Joseph John Hlavka, Tuxedo, N.Y., assignors to American Cyanamid Company, Stamford, Conn., a corporation of Maine
No Drawing. Filed Mar. 21, 1967, Ser. No. 624,711
10 Claims. (Cl. 260—559)

ABSTRACT OF THE DISCLOSURE

This disclosure describes compounds of the class of 7- and/or 9-nitro, amino or substituted amino-5a,6-anhydrotetracyclines and 7- and/or 9-nitro, amino or substituted amino-6-demethyl-5a,6-anhydrotetracyclines useful as intermediates in the preparation of the corresponding 7- and/or 9-substituted aminotetracyclines and 7- and/or 9-substituted amino-6-demethyltetracyclines which possess antibacterial activity.

Brief summary of the invention

This invention relates to new members of the tetracycline family and, more particularly, is concerned with novel compounds which may be represented by the following general formula:

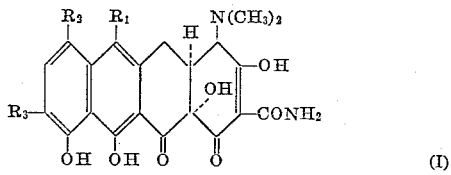

(I)

wherein $R_1$ is hydrogen or methyl, $R_2$ is hydrogen, nitro, amino, mono(lower alkyl)amino or di(lower alkyl)amino and $R_3$ is hydrogen, nitro, amino, mono(lower alkyl)amino or di(lower alkyl)amino with the proviso that $R_2$ and $R_3$ cannot both be hydrogen. Suitable lower alkyl groups are those having up to about 4 carbon atoms such as, for example, methyl, ethyl, isopropyl, n-butyl, and the like.

Detailed description of the invention

The novel 5a,6-anhydrotetracyclines of the present invention are, in general, yellow crystalline solids having characteristic melting points and absorption spectra. They are relatively insoluble in water, diethyl ether, cyclohexane and petroleum ether but are relatively soluble in methanol, ethanol, ethyl acetate, dimethylformamide, and the like. The infrared and ultraviolet absorption spectra are characteristic of the novel compounds of the present invention and provide a preferred means of distinguishing and identifying them.

The novel compounds of the present invention are capable of forming salts with a variety of organic and inorganic acids. Such salts may be readily prepared by the simple addition of acid to the tetracycline compound in an inert organic solvent such as methanol or ethanol. These salts include those prepared from acids such as hydrochloric, hydrobromic, hydriodic, sulfuric, phosphoric, sulfamic, tartaric, glycolic, citric, maleic, succinic, acetic, ascorbic, and the like. Furthermore, since the novel compounds of the present invention are amphoteric, they also form salts with a variety of organic and inorganic bases. Exemplary of these salts are alkali metal salts such as sodium and potassium salts, the ammonium salts, alkaline earth metal salts such as the calcium and magnesium salts, as well as salts with primary amines such as ethylenediamine. Such salts, of course, are prepared by conventional procedures recognized by those skilled in the art. For purposes of this invention, the free bases are equivalent to their cationic and anionic salts.

The novel 5a,6-anhydrotetracyclines of the present invention may be readily converted to the corresponding tetracyclines and 6-demethyltetracyclines in accordance with the following reaction scheme:

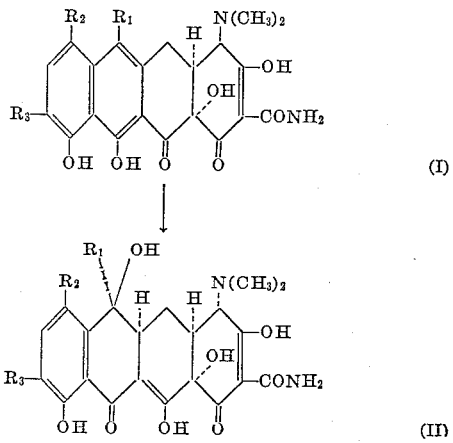

wherein $R_1$, $R_2$ and $R_3$ are as hereinabove defined. This conversion may be readily accomplished either photochemically or biologically by following the procedures set forth in U.S. patents, No. 3,053,740 to Miller et al., No. 3,146,265 to Scott et al. or No. 3,269,929 to Von Wittenau. Where $R_2$ and/or $R_3$ are nitro or amino, the resulting 7- and/or 9-nitro or aminotetracyclines or -6-demethyltetracyclines may be readily converted to the corresponding 7- and/or 9-substituted aminotetracyclines or -6-demethyltetracyclines by a reductive alkylation process as set forth in U.S. Patent No. 3,148,212 to Boothe et al. The 7- and/or 9-substituted amino-tetracyclines and -6-demethyltetracyclines (where $R_2$ and/or $R_3$ are mono(lower alkyl)amino or di(lower alkyl)amino are biologically active and possess the broad-spectrum antibacterial activity of the previously known tetracyclines. In particular, the 7-dimethylamino-6-demethyltetracycline, 7-dimethylamino - 6-demethyl-6-deoxytetracycline, 7-diethylamino-6-demethyl-6-deoxytetracycline and 7-isopropylamino-6-demethyl-6-deoxytetracycline possess extraordinary activity both orally and parenterally against Staphylococcus aureus, strain Smith, and Staphylococcus aureus, strain Rose, infections in mice.

The novel 5a,6-anhydrotetracyclines of the present invention may be readily prepared in accordance with the following reaction scheme:

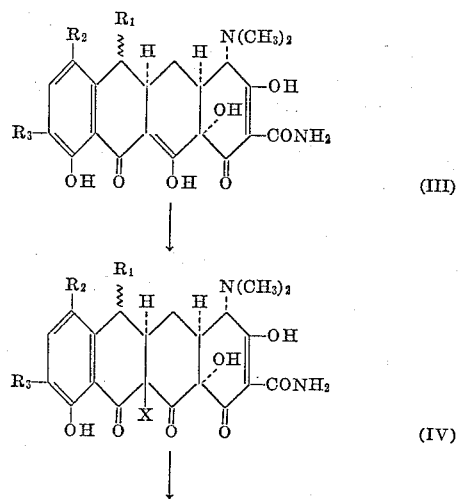

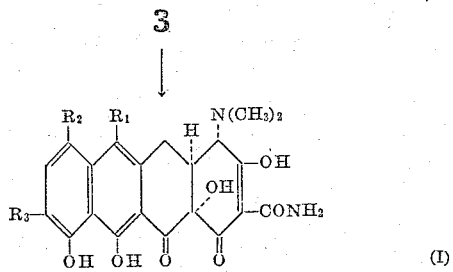

wherein $R_1$, $R_2$ and $R_3$ are as hereinabove defined and X is chloro or bromo. The conversion of an appropriate 6-deoxytetracycline (III) to the corresponding 11a-halo-6-deoxytetracycline (IV) is readily accomplished by treating the 6-deoxytetracycline with N-chlorosuccinimide or N-bromosuccinimide in a solvent such as chloroform at room temperature over a period of time of from a few minutes to an hour or more. The conversion of the 11a-halo-6-deoxytetracycline (IV) to the corresponding 5a,6-anhydrotetracycline (I) is accomplished by treating the 11a-halo-6-deoxytetracycline with a tetraethylammonium halide in acetonitrile at the reflux temperature of the acetonitrile for a period of a few hours. The intermediate 11a-halo-6-deoxytetracyclines and the 5a,6-anhydrotetracycline final products are readily isolated and purified by standard procedures well known to those skilled in the art.

The novel 5a,6-anhydrotetracyclines (I) of the present invention may also be readily prepared from 5a,6-anhydrotetracycline and 6-demethyl-5a,6-anhydrotetracycline as follows. The 5a,6-anhydrotetracycline or 6-demethyl-5a,6-anhydrotetracycline may be nitrated by the addition of potassium nitrate to a hydrofluoric acid solution of the compound at a temperature of 0° C.–25° C. over a period of time of from about 5 minutes to about 1 hour whereby the 7-nitro-5a,6-anhydrotetracycline, 9-nitro-5a,6-anhydrotetracycline, 7,9-dinitro-5a,6-anhydrotetracycline, 7-nitro-6-demethyl-5a,6-anhydrotetracycline, 9-nitro-6-demethyl-5a,6-anhydrotetracycline and 7,9-dinitro-6-demethyl-5a,6-anhydrotetracycline are obtained. These nitration products may be readily separated and purified by procedures well known to those skilled in the art such as recrystallization from various solvents and mixed solvent systems, chromatographic techniques and countercurrent distribution, all of which are usually employed for this purpose. These nitro derivatives may then be reduced to the corresponding 7-amino-5a,6-anhydrotetracycline, 9-amino-5a,6-anhydrotetracycline, 7-amino-9-nitro-5a,6-anhydrotetracycline, 7-nitro-9-amino-5a,6-anhydrotetracycline, 7,9-diamino-5a,6-anhydrotetracycline, 7-amino-6-demethyl-5a,6-anhydrotetracycline, 9-amino-6-demethyl-5a,6-anhydrotetracycline, 7-amino-9-nitro-6-demethyl-5a,6-anhydrotetracycline, 7-nitro-9-amino-6-demethyl-5a,6-anhydrotetracycline and 7,9-diamino-6-demethyl-5a,6-anhydrotetracycline by contacting them with a suitable reducing agent such as hydrogen. This is carried out by shaking the reaction mixture is a closed system in the presence of hydrogen gas and a noble metal catalyst at about 1–4 atmospheres of pressure. This reduction may be conveniently carried out at room temperature and over a period of time of from about 30 minutes to about 4–5 hours. Alternatively, reducing agents such as formic acid or metal-acid combinations may be used to carry out this reduction.

The 7- and/or 9-nitro and/or amino-5a,6-anhydrotetracycline or -6-demethyl-5a,6-anhydrotetracycline derivatives set forth above may be reductively alkylated to the corresponding mono(lower alkyl)amino and/or di(lower alkyl)amino derivatives by contacting them with a carbonyl compound of the general formula:

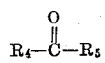

wherein $R_4$ and $R_5$ are the same or different and are hydrogen or lower alkyl, in the presence of a reducing agent. In this context, suitable lower alkyl groups are those having up to about 5 carbon atoms. Acordingly, aldehydes and ketones useful in carrying out this reductive alkylation include, for example, formaldehyde, acetaldehyde, propionaldehyde, n-butyraldehyde, isobutyraldehyde, acetone, methylethyl ketone, diethyl ketone, etc. The other general conditions of this reductive alkylation such as reducing agent, time, temperature and the like are conventional and are similar to those set forth in U.S. Patent No. 3,148,212 to Boothe et al. Typical 7- and/or 9-mono(lower alkyl)amino- and/or di(lower alkyl)amino-5a,6-anhydroetracyclines and -6-demethyl-5a,6-anhydrotetracyclines which may be thus prepared are:

7-dimethylamino-5a,6-anhydrotetracycline,
7-diethylamino-5a,6-anhydrotetracycline,
7-isopropylamino-5a,6-anhydrotetracycline,
9-methylamino-5a,6-anhydrotetracycline,
7-dimethylamino-6-demethyl-5a,6-anhydrotetracycline,
7-diethylamino-6-demethyl-5a,6-anhydrotetracycline,
7-isopropylamino-6-demethyl-5a,6-anhydrotetracycline, and
9-methylamino-6-demethyl-5a,6-anhydrotetracycline.

The invention will be described in greater detail in conjunction with the following specific examples.

EXAMPLE 1

*Preparation of 11a-chloro-6-demethyl-6-deoxy-7-dimethylaminotetracycline*

To a solution of 10 g. (22.6 mmole) of 6-demethyl-6-deoxy-7-dimethylaminotetracycline free base in 100 ml. of chloroform is added a solution of 3.15 g. (23.7 mmole) of N-chlorosuccinimide in 100 ml. of chloroform with stirring. Stirring is continued for one additional minute. The solution is filtered and the filtrate is concentrated to one-half of the original volume and then added slowly with stirring into 100 ml. of heptane. The precipitated solid is filtered, washed with two 10 ml. portions of heptane and dried in a vacuum desiccator. Yield=5.56 g.

EXAMPLE 2

*Preparation of 11a-bromo-6-demethyl-6-deoxy-7-dimethylaminotetracycline*

To a solution of 443.4 mg. (1.0 mmole) of 6-demethyl-6-deoxy-7-dimethylaminotetracycline free base in 3 ml. of chloroform is added with stirring a solution of 186.6 mg. (1.05 mmole) of N-bromosuccinimide in 7 ml. of chloroform. Stirring is continued for 15 additional minutes at room temperature. The solution is filtered and the filtrate is diluted with 50 ml. of ether. The precipitated light yellow solid is isolated by filtration, washed with 5 ml. of ether and dried.

EXAMPLE 3

*Preparation of 6-demethyl-7-dimethylamino-5a,6-anhydrotetracycline*

(A) A solution of 8 g. (16.8 mmole) of 11a-chloro-6-demethyl-6-deoxy-7-dimethylaminotetracycline and 1.44 g. (10.6 mmole) of tetraethylammonium bromide in 280 ml. of acetonitrile is prepared at room temperature. The solution is stirred for two and one-half hours at reflux temperature. It is then cooled to room temperature and the dark brown precipitate is filtered off. The product is purified by partition column chromatography. (System: Heptane-ethyl acetate-methanol-water: 80–20–17–4.)

(B) The same product is prepared using the 11a-bromo-6-demethyl-6-deoxy-7-dimethylaminotetracycline and the conditions under procedure A.

EXAMPLE 4

*Preparation of 11a-chloro-6-demethyl-6-deoxy-9-methyl-aminotetracycline*

This product is prepared according to the procedure of Example 1 using the 9-methylamino derivative in place of the 7-dimethylamino derivative.

EXAMPLE 5

*Preparation of 11a-bromo-6-demethyl-6-deoxy-9-methyl-aminotetracycline*

This product is prepared according to the procedure of Example 2 using the 6-demethyl-6-deoxy-9-methylamino-tetracycline.

EXAMPLE 6

*Preparation of 6-demethyl-9-methylamino-5a,6-anhydro-tetracycline*

This material is prepared according to the procedure of Example 3 using either the product of Example 4 or the 11a-bromo-derivative of Example 5 as starting material.

EXAMPLE 7

*Preparation of 11a-chloro-β-6-deoxy-7-dimethylamino-tetracycline*

This product is prepared according to the procedure of Example 1 using one mmole of β-6-deoxy-7-dimethylaminotetracycline and one equivalent of N-chlorosuccinimide.

EXAMPLE 8

*Preparation of 11a-bromo-β-6-deoxy-7-dimethylamino-tetracycline*

Example 7 is repeated using one equivalent amount of N-bromosuccinimide in place of N-chlorosuccinimide.

EXAMPLE 9

*Preparation of 11a-chloro-β-6-deoxy-9-methylamino-tetracycline*

Example 7 is repeated using one mmole of β-6-deoxy-9-methylaminotetracycline in place of 7-dimethylamino derivative.

EXAMPLE 10

*Preparation of 7-dimethylamino-5a,6-anhydrotetracycline*

This compound is prepared according to the procedure of Example 3 and using as starting material either the product of Example 7 or the product of Example 8.

EXAMPLE 11

*Preparation of 9 - methylamino-5a,6-anhydrotetracycline*

This compound is prepared according to the procedure of Example 3 using the product of Example 9 as starting material.

EXAMPLE 12

*Preparation of 11a-chloro-α-6-deoxy-7-dimethylamino-tetracycline*

This product is prepared according to the procedure of Example 1 using one mmole of α-6-deoxy-7-dimethyl-aminotetracycline and one equivalent of N-chlorosuccinimide.

EXAMPLE 13

*Preparation of 11a-bromo-α-6-deoxy-7-dimethylamino-tetracycline*

Example 12 is repeated using one equivalent of N-bromosuccinimide in place of N-chlorosuccinimide.

EXAMPLE 14

*Preparation of 11a-chloro-α-6-deoxy-9-methylamino-tetracycline*

Example 12 is repeated using one mmole of α-6-deoxy-91methylaminotetracycline in place of the 7-dimethylamino derivative.

EXAMPLE 15

*Preparation of 11a-bromo-α-6-deoxy-9-methylamino-tetracycline*

This product is prepared using one mmole of α-6-deoxy-9-methylaminotetracycline and one equivalent of N-bromosuccinimide.

EXAMPLE 16

*Preparation of 9-nitro-6-demethyl-5a,6-anhydrotetracycline*

(A) By direct nitration:

A solution of 618 mg. (1.5 mmole) of 6-demethyl-anhydrotetracycline neutral in 12 ml. of anhydrous liquid hydrogen fluoride in a polyethylene vessel was cooled in an ice bath as 168 mg. (1.65 mmole) of powdered potassium nitrate was added with stirring. After stirring for 40 minutes in the ice bath, the hydrogen fluoride was removed in a brisk stream of nitrogen. The black residue was dissolved in 30 ml. of water and brought to pH 4.5 with 10% aqueous sodium hydroxide. The brown precipitate was filtered off and dried, wt. 910 mg. A 120 mg. portion of the above crude material was purified by partition column chromatography on neutral (acid-washed) Celite®, using a system cyclohexane, dioxane, water (35:65:8), the product appearing in hold back volumes 1.3–1.8, wt. 35 mg.

(B) From 9-nitro-6-demethyl-6-deoxytetracycline:

A solution of 460 mg. (1.0 mole) of 9-nitro-6-demethyl-6-deoxytetracycline neutral in 160 ml. of freshly distilled dimethoxyethane was treated with 140 mg. (1.05 mmole) of N-chlorosuccinimide and the mixture stirred at room temperature for 20 minutes. Undissolved material was filtered off, and the filtrate was evaporated to an oil which was dissolved in 8 ml. of methanol and poured into 250 ml. of rapidly stirred dry ether. The precipitate was filtered off and dried, wt. 230 mg. The material had a band in the I.R. at $5.8\mu$ and had a U.V. ratio of 260/$360m\mu$ of 3.1 to confirm the formation of the 11a-chloro compound. The above crude material (90 mg.; 0.2 mmole) was dissolved in 10 ml. of dry acetonitrile and 17 mg. of tetraethylammonium bromide was added. After refluxing the solution for 2.5 hours, the solvent was removed in vacuo. The residue was dissolved in 3 ml. of methanol and precipitated with ether. The precipitate was filtered off and dried then dissolved in 0.1 ml. of propylene oxide and 15 ml. of methanol. After two hours the solution was evaporated to dryness. A 70 mg. portion of the above crude was purified by partition column chromatography on versene treated Celite® using a system ethyl acetate, methyl Cellosolve, water (4:1:1), the product appearing in the third hold back volume, wt. 14 mg. The $R_f$'s on paper chromatography and the U.V. spectra were identical to material prepared by direct nitration.

What is claimed is:

1. A compound selected from the group consisting of those of the formula:

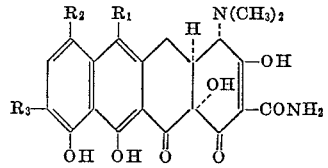

wherein $R_1$ is selected from the group consisting of hydrogen and methyl; $R_2$ is selected from the group consisting of hydrogen, mono (lower alkyl) amino and di (lower alkyl)-amino and $R_3$ is selected from the group consisting of hydrogen, mono(lower alkyl)amino and di(lower alkyl)amino with the proviso that $R_2$ and $R_3$ cannot both be hydrogen; and the non-toxic pharmaceutically acceptable cationic and anionic salts thereof.

2. A compound according to claim 1 wherein $R_1$ is hydrogen, $R_2$ is dimethylamino and $R_3$ is hydrogen.

3. A compound according to claim 1 wherein $R_1$ is hydrogen, $R_2$ is hydrogen and $R_2$ is methylamino.

4. A compound according to claim 1 wherein $R_1$ is methyl, $R_2$ is dimethylamino and $R_3$ is hydrogen.

5. A compound according to claim 1 wherein $R_1$ is methyl, $R_2$ is hydrogen and $R_3$ is methylamino.

6. A compound according to claim 1 wherein $R_1$ is hydrogen, $R_2$ is isopropylamino and $R_3$ is hydrogen.

7. A compound according to claim 1 wherein $R_1$ is hydrogen, $R_2$ is methylisopropylamino and $R_3$ is hydrogen.

8. A compound according to claim 1 wherein $R_1$ is hydrogen, $R_2$ is methylethylamino and $R_3$ is hydrogen.

9. A compound according to claim 1 wherein $R_1$ is hydrogen, $R_2$ is diethylamino and $R_3$ is hydrogen.

10. A compound according to claim 1 wherein $R_1$ is methyl, $R_2$ is isopropylamino and $R_3$ is hydrogen.

References Cited

UNITED STATES PATENTS 3,250,810   5/1966   Blackwood et al. ____ 260—559

NICHOLAS S. RIZZO, *Primary Examiner.*